United States Patent
Kim

(10) Patent No.: US 6,268,937 B1
(45) Date of Patent: Jul. 31, 2001

(54) FACSIMILE SYSTEM CAPABLE OF DOCUMENT TRANSMISSION WITH SHORTENED TRANSMISSION TIME

(75) Inventor: Yong-Woo Kim, AhnYang (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 08/931,127

(22) Filed: Sep. 16, 1997

(30) Foreign Application Priority Data

Sep. 16, 1996 (KR) .................................................. 96-40195

(51) Int. Cl.[7] ........................................................ H04N 1/04
(52) U.S. Cl. ......................... 358/488; 358/498; 358/468; 358/444; 358/450
(58) Field of Search ..................... 358/498, 406, 358/443, 449, 468, 528, 448, 431, 451, 488, 496, 404, 444, 450; 382/286

(56) References Cited

U.S. PATENT DOCUMENTS

| | | |
|---|---|---|
| 4,047,228 | 9/1977 | Yagishita et al. . |
| 4,302,781 | 11/1981 | Ikeada et al. . |
| 4,386,373 | 5/1983 | Kondo et al. . |
| 4,439,790 | 3/1984 | Yoshida . |
| 4,549,221 | 10/1985 | Yamamoto et al. . |
| 4,554,592 | 11/1985 | Yoshida . |
| 4,586,088 | 4/1986 | Kondo . |
| 4,622,594 * | 11/1986 | Honjo et al. ........................... 358/293 |
| 4,672,460 | 6/1987 | Tsuda . |
| 4,775,893 | 10/1988 | Ishikawa . |
| 5,045,953 | 9/1991 | Kotani et al. . |
| 5,414,522 * | 5/1995 | Moriya ................................. 358/296 |
| 5,428,459 | 6/1995 | Asai . |
| 5,500,725 * | 3/1996 | Takasu et al. ........................ 355/311 |
| 5,691,820 * | 11/1997 | Komatsu .............................. 358/434 |
| 5,875,033 * | 2/1999 | Kawata et al. ....................... 358/296 |

* cited by examiner

Primary Examiner—Cheukfan Lee
(74) Attorney, Agent, or Firm—Robert E. Bushnell, Esq.

(57) ABSTRACT

A facsimile system includes a first plurality of document detection sensors for detecting standard sized documents, a second plurality of document detection sensors respectively interposed between the first plurality of document detection sensors for detecting non-standard sized documents, a memory table for semi-standardizing a document size according to an activation status from one of said first and second plurality of sensors, and a controller for controlling transmission of a semi-standard sized document based upon said memory table via a telephone line to reduce a document transmission time.

20 Claims, 5 Drawing Sheets

FACSIMILE SYSTEM CAPABLE OF DOCUMENT TRANSMISSION WITH SHORTENED TRANSMISSION TIME

CLAIM FOR PRIORITY

This application makes reference to, incorporates the same herein, and claims all benefits accruing under 35 U.S.C. §119 from an application for DEVICE AND METHOD FOR REDUCING DOCUMENT TRANSMISSION TIME IN FACSIMILE earlier filed in the Korean Industrial Property Office on Sept. 16, 1996, and there duly assigned Ser. No. 40195/1996, a copy of which application is annexed hereto.

BACKGROUND OF THE INVENTION

1. Technical Field

The present invention relates to a facsimile system and a method for controlling document transmission, and more particularly, relates to a facsimile system capable of document transmission with shortened transmission time.

2. Related Art

Contemporary facsimile system generally transmits information data of a document on a standard sized paper. Document sensors are positioned at predetermined locations of the facsimile system to detect different sizes of the document for proper transmission via a telephone line. An original document for transmission may be one of several standard sizes, such as A4, B4, A3, and alternatively, of non-standard sizes, such as photographic size or a variety of irregular sizes.

In order to compensate for the difference between the transmission size and the original document size, white pixels are commonly added as dummy data to every transmission lines, which results into an increase of the transmission time and the telephone fee. Exemplars of contemporary facsimile systems using dummy data are disclosed in U.S. Pat. No. 4,047,228 for Receiving System For Facsimile And The Like issued to Yagishita et al., U.S. Pat. No. 4,302,781 for Facsimile System issued to Ikeda et al., U.S. Pat. No. 4,386,373 for Facsimile Apparatus issued to Kondo et al., U.S. Pat. No. 4,549,221 for Video Signal Transmitting System issued to Yamamoto et al., U.S. Pat. No. 4,672,460 for Facsimile Apparatus issued to Facsimile Apparatus issued to Tsuda, U.S. Pat. No. 4,775,893 for Facsimile Transmission System issued to Ishikawa, U.S. Pat. No. 5,428,459 for Facsimile Apparatus For Minimizing Printing Of White Data At End Of Page issued to Asai. While the contemporary facsimile system offers a variety of transmission techniques for reducing the document transmission time, I have noted that detection of paper size as close to the actual size may be effectively used to reduce an amount of dummy data to be transmitted in order to shorten the document transmission time and reduce the telephone fee.

SUMMARY OF THE INVENTION

Accordingly, it is therefore an object of the present invention to provide a facsimile system capable of document transmission with shortened transmission time.

It is also an object to provide a facsimile system capable of faster document transmission with minimal dummy data.

It is another object to provide a facsimile system having a plurality of document sensors positioned at different locations to accurately detect the actual size of a document and transmit the document in accordance with the detected document size in order to reduce the amount of dummy data required for transmission and thereby shortening the document transmission time.

These and other objects of the present invention can be achieved by a facsimile system which includes a first plurality of sensors positioned at different locations along a paper path for detecting a document of different standard sizes; a second plurality of sensors respectively positioned adjacent to said first plurality of sensors along the paper path for detecting the document of different non-standard sized documents; a memory table for semi-standardizing a document size according to an activation status from one of the first and second plurality of sensors; and a controller for controlling transmission of a semi-standard sized document based upon the memory table via a telephone line to reduce a document transmission time.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
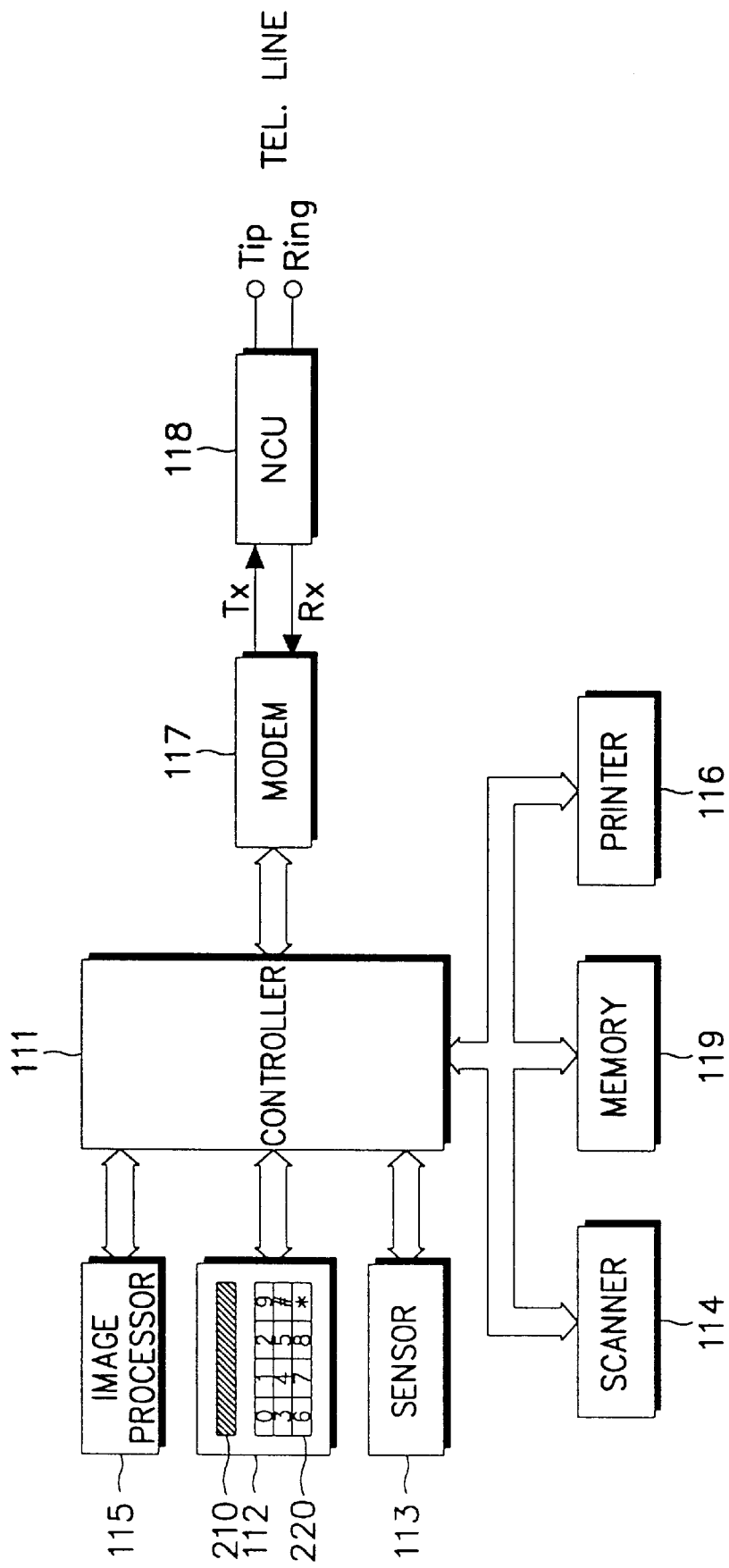
FIG. 1 is a block diagram of a facsimile system constructed according to the principles of the present invention.

Referring now to the drawings and particularly to FIG. 1, which illustrates a facsimile system constructed according to the principles of the present invention. As shown in FIG. 1, the facsimile system includes a controller 111 for controlling operations of the facsimile system, an operational panel OPE 112, a sensor 113, a scanner 114, an image processor 115, a printer 116, a modem 117, a network control unit NCU 118 connected to a tip and ring terminal of a telephone line, a memory 119, and a telephone (not shown).

Memory 119 includes a program read-only-memory (ROM) and a data random-access-memory (RAM). The ROM stores a program for the controller 111 to control the general operation of the facsimile system for transmission or reception of image data from another facsimile system, and a program for scanning a document, recognizing different sizes of the document and storing recognized size of the document in RAM. The data RAM also temporarily stores a variety of items of data information relating to the operation of the facsimile system.

The OPE 112 includes a display unit 210 and a key input unit 220. The key input unit 220 of the OPE 112 comprises a plurality of discrete keys for generating key data to the controller 111 to control the scanning of a document, to recognize the size of the document and store information in RAM of memory 119, and a plurality of function keys for allowing the user to operate the facsimile system. The display unit 210 of the OPE 20 displays data indicating various modes of operations of the facsimile system, including a visual display of the different size of document sensed by sensor 113. The sensor 113 senses whether a document is input into the facsimile system, or whether copy paper is stored and available for use, and generates an indicative signal to the controller 111. In addition, sensor 113 is also used to detect the different size of document input for transmission via a telephone line. The scanner 114 transports and scans an image of the input document and then generates image data corresponding to the scanned image. The image data output from the scanner 114 is then processed for either transmission via a telephone line or copy during the copy mode under control of the controller 111. The image processor 115 encodes the image data generated from the scanner 114 and decodes the image data generated from modem 117. That is, the image processor 115 classifies the image data received from the scanner 114 into a background and a text and generates gradational image data, so that a called facsimile system may receive the image which is almost the same as the original image. The printer 116 prints the processed image data received from the NCU 118 on a printable medium such as individual cut sheets of papers during the reception mode and the copy mode under the control of the controller 111.

The modem 117 modulates the processed image data output from the controller 111 into a modulated image signal for transmission, and duplicates the image signal input to the controller 111 during the reception mode under the control of the controller 111. The NCU 118 is connected with a tip and ring terminals of a telephone line to form transmission and reception paths for the modem 117 under the control of the controller 111.

Figure 2:
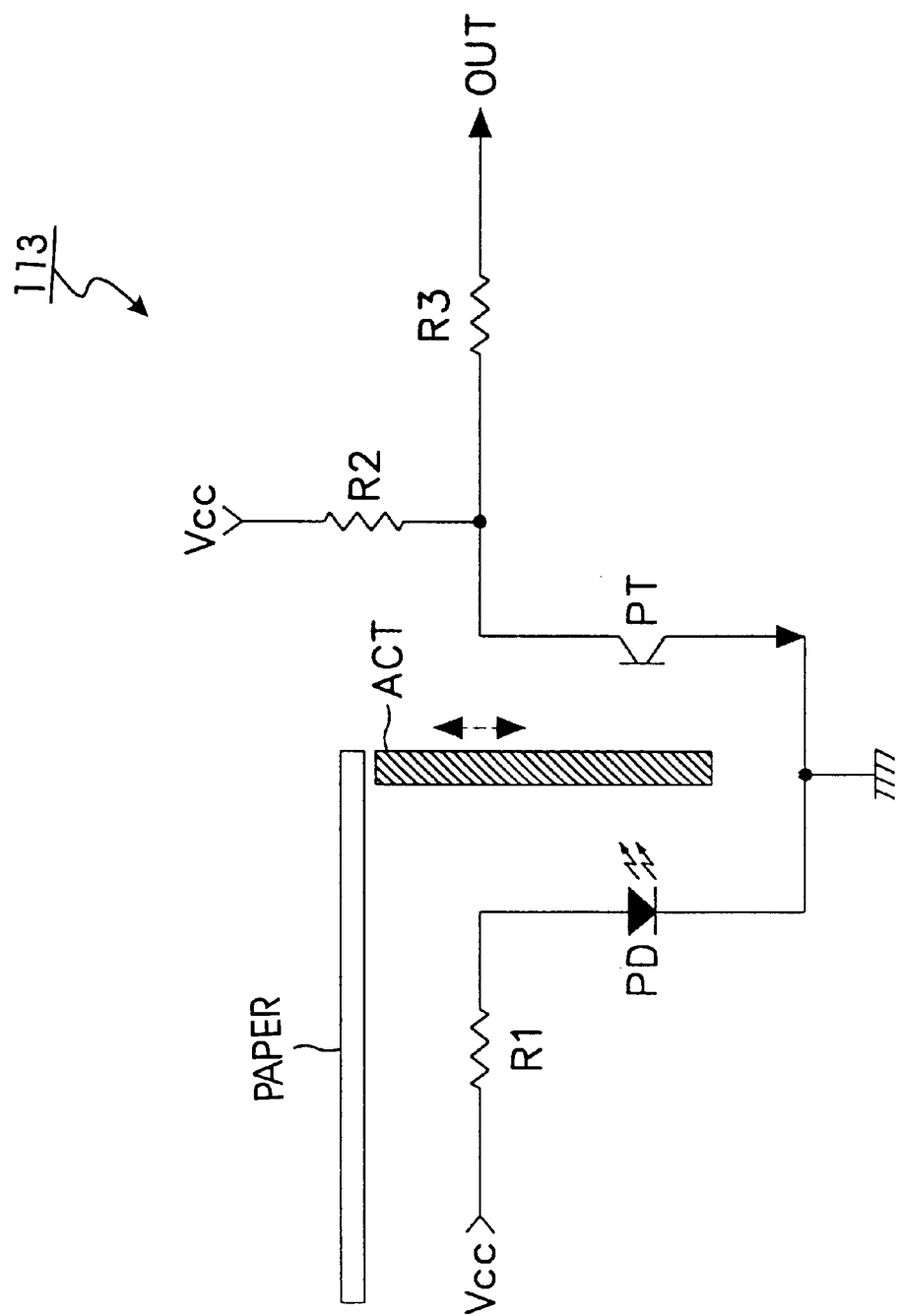
FIG. 2 is a detailed circuit diagram of a document detection sensor usable in the facsimile system.

FIG. 2 illustrates a circuit construction of each sensor 113. The sensor 113 is constructed of a photodiode PD, a phototransistor PT and a plurality of resistors R1–R3. When a document PAPER is placed on an actuator ACT pushing the actuator ACT downward, a light beam traveling from a photodiode PD to a phototransistor PT will be cut off. As a result, the phototransistor PT is turned off, generating high current at a collector which is a document detection signal indicating the presence of a document.

Figure 3:
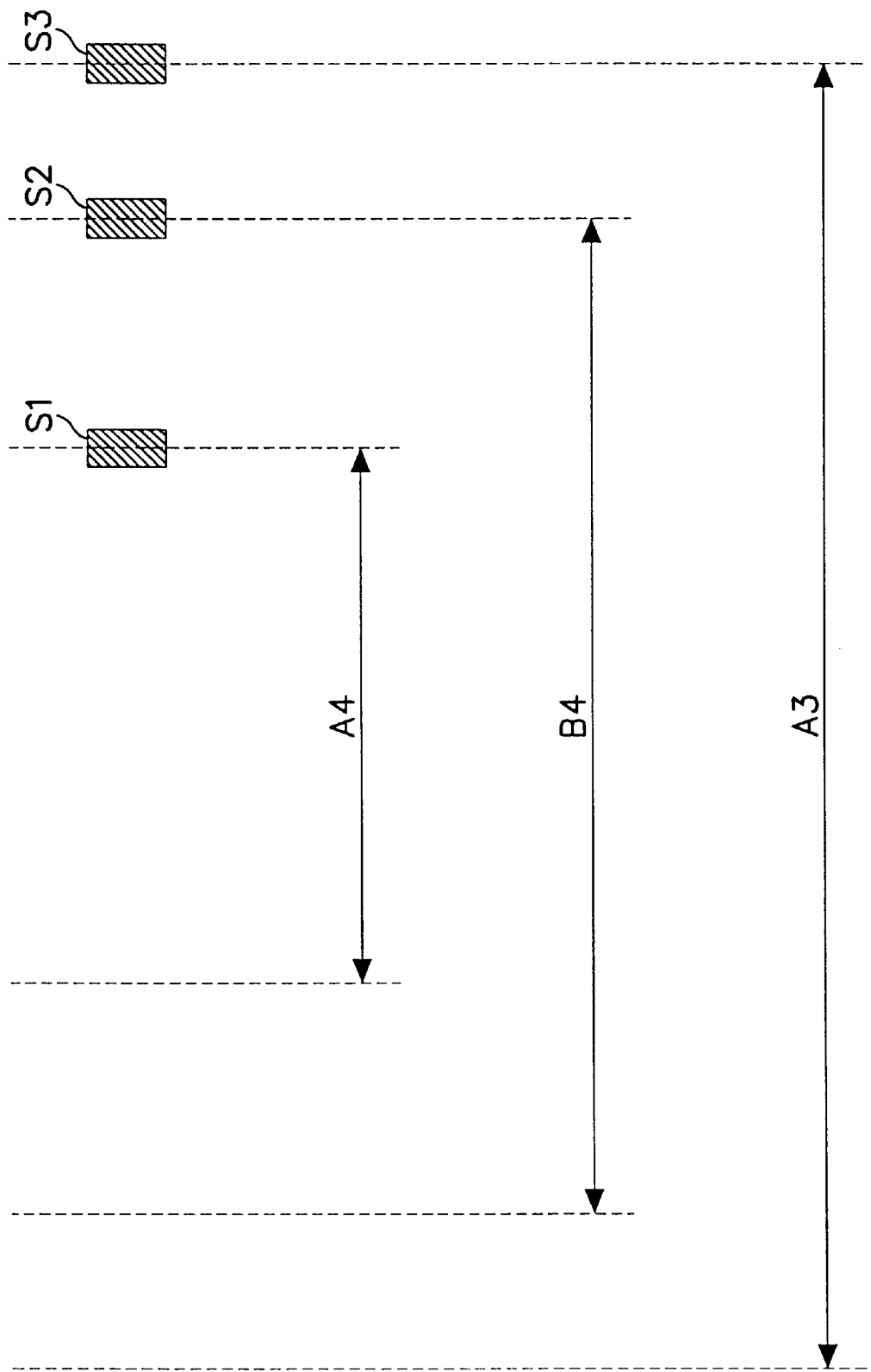
FIG. 3 illustrates a typical arrangement of document detection sensors usable in the facsimile system.

FIG. 3 illustrates a typical arrangement of document detection sensors 113 positioned at different locations in the facsimile system for detecting different sizes of a document. As shown in FIG. 3, a first, second, and third sensors S1–S3 are arranged at different intervals on the same line of the facsimile system to detect different standard sized documents, on the assumption that the standard sizes of the documents are A4, B4, and A3. A typical facsimile system with such an arrangement of document detection sensors takes a non-standard document smaller than A4 for an A4 sheet, a non-standard document larger than A4 but smaller than B4 for an B4 sheet, and a non-standard sized document lager than B4 but smaller than A3 for an A3 sheet. In order to compensate for the difference between the transmission size and the original document size, as I have noted earlier, white pixels are commonly added as dummy data to every transmission lines, which results into an increase of the transmission time and the telephone fee. Therefore, it is necessary to detect paper size as close to the actual size as possible in order to effectively reduce an amount of dummy data to be transmitted so as to shorten the document transmission time and reduce the telephone fee.

Figure 4:
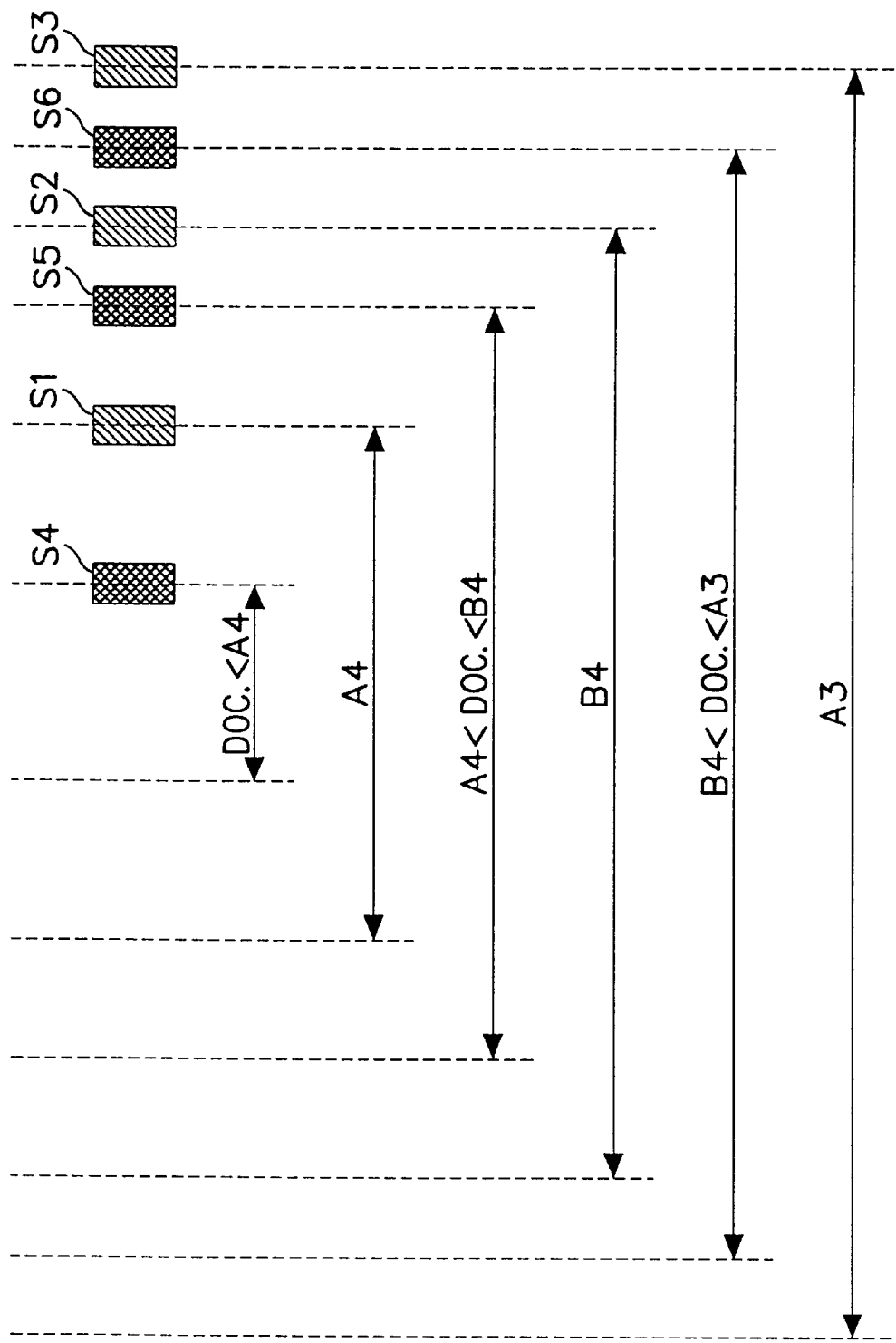
FIG. 4 illustrates an arrangement of document detection sensors according to the principles of the present invention.

Turning now to FIG. 4, which illustrates an arrangement of paper sensors 113 according to the principles of the present invention. First through third sensors S1–S3 are arranged at particular intervals on the same line to detect the standard sized documents, on the assumption that the standard sizes of the documents are A4, B4, and A3. In addition, a fourth sensor S4 is arranged at the left-hand side of the first sensor S1, at a particular interval therebetween. A fifth sensor S5 is interposed between the first and second sensors S1 and S2. Similarly, a sixth sensor S6 is interposed between the second and third sensors S2 and S3. Therefore, if only the fourth sensor S4 is activated, it will be judged that the document is smaller than the A4 sheet. Further, if only the fifth sensor S5 is activated, it will be judged that the document is larger than A4 but smaller than B4. Likewise, if only the sixth sensor S6 is activated, it will be judged that the document is larger than B4 but smaller than A3. As a result, although the document has non-standard size, the facsimile system can detect the document size as close to an actual size as possible by way of the fourth through sixth sensors S4–S6. Therefore, in contrast to the contemporary facsimile system, the facsimile system constructed according to the principles of the present invention will send much less dummy data, thereby saving the transmission time. The sizes of the non-standard documents determined in this manner will be regarded as semi-standard sizes. Data amount information with respect to the semi-standard sized documents is stored in a memory table of the memory 119.

Figure 5:
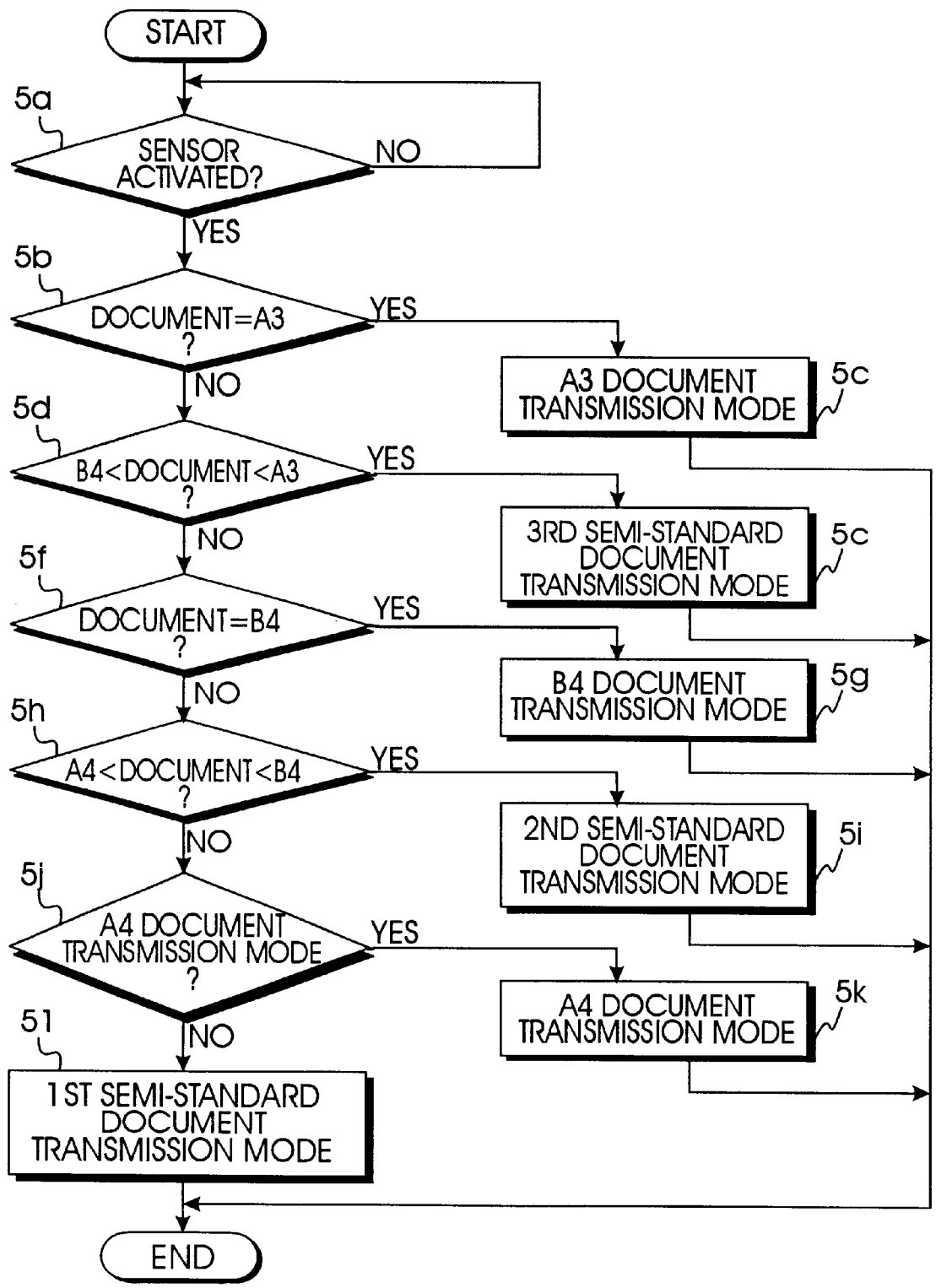
FIG. 5 is a flowchart illustrating a process of document transmission with shortened transmission time according to the principles of the present invention.

Now, the process of document transmission with shortened transmission time according to the principles of the present invention will be described in detail with reference to FIGS. 1, 4 and 5.

First, when the document is placed on a document tray, the controller 111 determines whether or not any one of the first to sixth sensors S1–S6 is activated at step 5a. If the third sensor S3 which is positioned to detect a document size of A3 paper as shown in FIG. 4, is activated at step 5b, the controller 111 determines that the document has a A3 size, and the facsimile system operates in the transmission mode for the A3 size paper at step 5c.

Next, if the sixth sensor S6, which is positioned between second and third sensors S2 and S3 as shown in FIG. 4, is activated at step 5d, the controller 111 determines that the document size is larger than B4 but smaller than A3. The facsimile system operates in the transmission mode for a third semi-standard document size (i.e., B4<paper size <A3), at step 5e. Alternatively, if the second sensor S2 is activated at a step 5f, it is judged that the document size is B4, and the facsimile operates in the transmission mode for the B4 size, at a step 5g. If the fifth sensor S5, which is positioned between the first and second sensors S1 and S2, is activated at step 5h, the controller 111 determines that the document size is larger than A4 but smaller than B4, and the facsimile system operates in the transmission mode for a second semi-standard document size (i.e., A4<paper size<B4), at step 5i.

Alternatively, if the first sensor S1 is activated at step 5j, the controller 111 determines that the document size is A4, and the facsimile system operates in the transmission mode for the A4 size, at step 5k. Lastly, if the fourth sensor S4, which is positioned adjacent to first sensor S1, is activated at step 5j, the controller 111 determines that the document size is less than A4, and the facsimile system operates in the transmission mode for a first semi-standard document size (i.e., paper size <A4), at step 5l.

As is apparent from the foregoing description, the document size detection step is subdivided so that the facsimile system of the invention can detect non-standard sized document as close to the actual document size as possible. This way, dummy data is minimized, and it is therefore possible to reduce the document transmission time and save the telephone fee.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A facsimile system, comprising:
   a first plurality of sensors positioned at different locations along a paper path for detecting a size of a document selected from among different standard sizes;
   a second plurality of sensors respectively positioned adjacent to said first plurality of sensors along said paper path for detecting said size of the document selected from among different non-standard sizes;
   a memory table for determining said size of the document according to an activation status from one of said first and second plurality of sensors; and
   a control unit for controlling transmission of a non-standard size document in accordance with said memory table via a telephone line to reduce a document transmission time and to minimize an amount of additional data, said additional data being added when necessary to cause said size of the document to correspond to one of said standard or non-standard sizes.

2. The facsimile system of claim 1, further comprised of said first plurality of sensors comprising first, second, and third sensors for detecting A4, B4, and A3 standard sized documents, respectively.

3. The facsimile system of claim 2, further comprised of said second plurality of sensors comprising fourth, fifth, and sixth sensors for detecting said different non-standard sizes corresponding to a document smaller than the A4 size, a document larger than the A4 size but smaller than the B4 size, and a document larger than the B4 size but smaller than the A3 size, respectively.

4. The facsimile system of claim 3, each one of said sensors comprising:
   a photodiode emitting light;
   a phototransistor receiving the light from said photodiode;
   an actuator being movable between a first position blocking the light and preventing said phototransistor from receiving the light and a second position not blocking the light and not preventing said phototransistor from receiving the light, the document pushing said actuator from said second position to said first position when the document is adjacent to said actuator; and
   when said actuator is in said first position, said phototransistor being turned off to output a detection signal to said control unit, said control unit controlling said transmission of the non-standard size document in accordance with said detection signal.

5. The facsimile system of claim 1, further comprised of said first and second plurality of sensors comprising:
   first, second, and third sensors positioned along said paper path for activating upon detection of the document corresponding to one of an A4, B4, and A3 standard size, respectively;
   a fourth sensor positioned adjacent to said first sensor along said paper path for activating upon detection of the document corresponding to a first non-standard size smaller than the A4 size;
   a fifth sensor positioned between said first sensor and said second sensor along said paper path for activating upon detection of the document corresponding to a second non-standard size larger than the A4 size but smaller than the B4 size; and
   a sixth sensor positioned between said second sensor and said third sensor along said paper path for activating upon detection of the document corresponding to a third non-standard size larger than the B4 size but smaller than the A3 size.

6. The facsimile system of claim 1, further comprising a display unit for providing a visual display of a magnitude of the document transmission via said telephone line.

7. The facsimile system of claim 6, said magnitude of the document corresponding to said size of the document selected from among said standard sizes A4, B4, and A3 and said non-standard sizes smaller than A4, larger than A4 and smaller than B4, and larger than B4 and smaller than A3.

8. The facsimile system of claim 6, said magnitude of the document corresponding to a number of bytes of the document.

9. A facsimile system, comprising:
   a paper tray for containing a document having a size corresponding to one of different standard sizes and different non-standard sizes;
   a first sensor positioned along a paper path for activating upon detection that said size of the document corresponds to a first standard size;
   a second sensor positioned adjacent to said first sensor along said paper path for activating upon detection that said size of the document corresponds to a second standard size;
   a third sensor positioned adjacent to said second sensor along said paper path for activating upon detection that said size of the document corresponds to a third standard size;
   a fourth sensor positioned adjacent to said first sensor along said paper path for activating upon detection that said size of the document corresponds to a first non-standard size smaller than said first standard size;
   a fifth sensor positioned between said first sensor and said second sensor along said paper path for activating upon detection that said size of the document corresponds to a second non-standard size larger than said first standard size but smaller than said second standard size;
   a sixth sensor positioned between said second sensor and said third sensor along said paper path for activating upon detection that said size of the document corresponds to a third non-standard size larger than said second standard size but smaller than said third standard size;
   a memory table for determining said size of the document according to an activation status from one of said first, second, third, fourth, fifth, and sixth sensors; and
   a control unit for controlling a document transmission mode in accordance with the document having said size determined in accordance with said memory table to reduce a document transmission time and to minimize an amount of additional data, said additional data being added when necessary to cause said size of the document to correspond to one of said standard and non-standard sizes.

10. The facsimile system of claim 9, further comprised of said first, second, and third standard sizes corresponding to A4, B4, and A3 sizes, respectively.

11. The facsimile system of claim 10, each one of said sensors comprising:

a photodiode emitting light;

a phototransistor receiving the light from said photodiode;

an actuator being movable between a first position blocking the light and preventing said phototransistor from receiving the light and a second position not blocking the light and not preventing said phototransistor from receiving the light, the document pushing said actuator from said second position to said first position when the document is adjacent to said actuator; and when said actuator is in said first position, said phototransistor being turned off to output a detection signal to said control unit, said control unit controlling said document transmission mode in accordance with said detection signal.

12. The facsimile system of claim 9, further comprising a display unit for providing a visual display of a magnitude of the document transmission via said telephone line.

13. The facsimile system of claim 12, said magnitude of the document corresponding to said size of the document selected from among said standard sizes A4, B4, and A3 and said non-standard sizes smaller than A4, larger than A4 and smaller than B4, and larger than B4 and smaller than A3.

14. The facsimile system of claim 12, said magnitude of the document corresponding to a number of bytes of the document.

15. A method for reducing a document transmission time in a facsimile system, comprising the steps of:

determining whether one of a first and a second plurality of sensors is activated for document transmission, said first plurality of sensors positioned along a paper path to respectively detect a size of a document selected from among different standard sizes, and said second plurality of sensors positioned adjacent to said first plurality of sensors along said paper path to respectively detect said size of the document selected from among different non-standard sizes;

when one of said first plurality of sensors is activated, determining that said size of the document corresponds to one of said different standard sizes, and controlling document transmission in a corresponding transmission mode for the document; and when one of said second plurality of sensors is activated, determining that said size of the document corresponds to one of said different non-standard sizes, and controlling document transmission in a corresponding transmission mode for the document in order to reduce a document transmission time and to minimize an amount of additional data, said additional data being added when necessary to cause said size of the document to correspond to one of said standard or non-standard sizes.

16. The method of claim 15, further comprised of said first and second plurality of sensors comprising:

first, second, and third sensors positioned along said paper path for activating upon detection of the document corresponding to one of an A4, B4, and A3 standard size, respectively;

a fourth sensor positioned adjacent to said first sensor along said paper path for activating upon detection of the document corresponding to a first non-standard size smaller than the A4 size;

a fifth sensor positioned between said first sensor and said second sensor along said paper path for activating upon detection of the document corresponding to a second non-standard size larger than the A4 size but smaller than the B4 size; and a sixth sensor positioned between said second sensor and said third sensor along said paper path for activating upon detection of the document corresponding to a third non-standard size larger than the B4 size but smaller than the A3 size.

17. The method of claim 16, each one of said second plurality of sensors comprising:

a photodiode emitting light;

a phototransistor receiving the light from said photodiode;

an actuator being movable between a first position blocking the light and preventing said phototransistor from receiving the light and a second position not blocking the light and not preventing said phototransistor from receiving the light, the document pushing said actuator from said second position to said first position when the document is adjacent to said actuator; and when said actuator is in said first position, said phototransistor being turned off to output a detection signal, said controlling of said document transmission being in accordance with said detection signal.

18. The method of claim 15, further providing a visual display of a magnitude of the document transmission via said telephone line.

19. The method system of claim 18, said magnitude of the document corresponding to said size of the document selected from among said standard sizes A4, B4, and A3 and said non-standard sizes smaller than A4, larger than A4 and smaller than B4, and larger than B4 and smaller than A3.

20. The method of claim 18, said magnitude of the document corresponding to a number of bytes of the document.

* * * * *